US012420296B2

(12) United States Patent
Liu et al.

(10) Patent No.: US 12,420,296 B2
(45) Date of Patent: Sep. 23, 2025

(54) ULTRASONIC ATOMIZER FOR APPLYING A COATING TO A SUBSTRATE WITH ELECTROSTATIC CHARGE TO PREVENT DROPLET COALESCENCE DURING ATOMIZATION

(71) Applicant: Ford Motor Company, Dearborn, MI (US)

(72) Inventors: Wanjiao Liu, Ann Arbor, MI (US); Christopher Michael Seubert, New Hudson, MI (US); Mark Edward Nichols, Saline, MI (US)

(73) Assignee: Ford Motor Company, Dearborn, MI (US)

( * ) Notice: Subject to any disclaimer, the term of this patent is extended or adjusted under 35 U.S.C. 154(b) by 84 days.

(21) Appl. No.: 17/495,500

(22) Filed: Oct. 6, 2021

(65) Prior Publication Data

US 2023/0105482 A1 Apr. 6, 2023

(51) Int. Cl.
*B05B 5/025* (2006.01)
*B05B 5/03* (2006.01)
*B05B 5/053* (2006.01)

(52) U.S. Cl.
CPC .............. *B05B 5/0255* (2013.01); *B05B 5/03* (2013.01); *B05B 5/0533* (2013.01)

(58) Field of Classification Search
CPC . B05B 17/0607; B05B 17/0646; B05B 17/06; B05B 5/0533; B41J 2202/15
See application file for complete search history.

(56) References Cited

U.S. PATENT DOCUMENTS 4,854,506 A * 8/1989 Noakes ................. B05B 5/0255 239/707
5,011,086 A * 4/1991 Sonnleitner ........... B05B 5/0533 239/691
5,303,865 A * 4/1994 Bert ...................... B05B 7/0815 239/428
7,384,670 B2 * 6/2008 Tani .................... B05B 17/0623 239/102.1
7,954,486 B2 * 6/2011 Papania ............... A61M 11/005 128/200.14
10,639,194 B2 * 5/2020 Hunter ................ B05B 17/0661
10,752,997 B2 * 8/2020 Jiang ....................... C23C 24/08
10,799,905 B2 * 10/2020 Seubert ................ B25J 11/0075
11,260,416 B2 * 3/2022 Wilkerson ........... B41J 2/14233
(Continued)

FOREIGN PATENT DOCUMENTS

DE 4328088 5/2005
DE 102015213732 1/2017

*Primary Examiner* — Joseph A Greenlund
(74) *Attorney, Agent, or Firm* — Burris Law, PLLC

(57) ABSTRACT

An atomizer for applying a coating to a substrate includes a nozzle and at least one electrode. The nozzle defines a plurality of apertures. The nozzle includes a nozzle plate, a nozzle body, and an actuator. The nozzle plate defines the apertures. The nozzle body and an inner side of the nozzle plate define a reservoir in fluid communication with the first apertures. The actuator is configured to vibrate the nozzle plate to eject droplets of a liquid from the reservoir through the first apertures. The at least one electrode is configured to directly or indirectly electrostatically charge the droplets with a charge that repels the droplets from each other to reduce coalescence of the droplets before the droplets reach the substrate.

15 Claims, 6 Drawing Sheets

(56) References Cited

U.S. PATENT DOCUMENTS

2003/0143315 A1* 7/2003 Pui ............ B05B 5/08 427/2.24
2005/0136190 A1* 6/2005 Tani ............ B05B 5/04 239/223
2006/0071357 A1* 4/2006 Pilon ............ B01J 13/04 264/4
2006/0081728 A1* 4/2006 Willey ............ B05B 1/044 239/690
2006/0108436 A1* 5/2006 Alexander ............ B05B 5/03 238/291
2008/0062227 A1* 3/2008 Onozawa ............ B41J 2/06 347/68
2009/0032612 A1* 2/2009 Kunstmann ............ B05B 17/0607 118/724
2009/0223513 A1* 9/2009 Papania ............ B05B 17/0638 128/200.14
2010/0231623 A1* 9/2010 Hirato ............ B41J 2/155 347/34
2011/0262622 A1* 10/2011 Herre ............ B41J 3/4073 118/712
2013/0150812 A1* 6/2013 Hunter ............ A61F 9/0026 604/295
2013/0233245 A1* 9/2013 Chae ............ B05B 5/087 239/690
2013/0284833 A1* 10/2013 Fritz ............ B05B 7/0815 239/102.1
2013/0287962 A1* 10/2013 Deng ............ B05B 5/0255 204/600
2013/0334335 A1* 12/2013 Wilkerson ............ B05B 1/02 239/4
2014/0336618 A1* 11/2014 Wilkerson ............ A61M 15/025 604/521
2015/0061458 A1* 3/2015 Kageyama ............ H02N 1/08 29/886
2017/0361346 A1* 12/2017 Lahidjanian ............ B05B 1/14
2018/0141061 A1* 5/2018 Ito ............ B05B 5/0407
2018/0221896 A1* 8/2018 Yamada ............ B05B 5/0407
2019/0060936 A1* 2/2019 Yokoyama ............ B05B 12/004
2019/0232661 A1* 8/2019 Akai ............ B05B 15/20
2019/0283053 A1* 9/2019 Yamada ............ B05B 5/0532
2020/0139704 A1* 5/2020 Muramatsu ............ B05B 17/0676
2020/0369516 A1* 11/2020 Birmingham ............ B33Y 30/00
2021/0046754 A1* 2/2021 Ungerer ............ B05B 1/083
2021/0086511 A1* 3/2021 Yokoyama ............ B41J 2/2128
2022/0048290 A1* 2/2022 Maeda ............ B05C 11/1013
2022/0072578 A1* 3/2022 Meacham ............ B05B 17/0638
2023/0105482 A1* 4/2023 Liu ............ B05B 5/0255 239/690
2023/0158190 A1* 5/2023 Schmitt-John ............ A61L 2/14 422/29

* cited by examiner

ULTRASONIC ATOMIZER FOR APPLYING A COATING TO A SUBSTRATE WITH ELECTROSTATIC CHARGE TO PREVENT DROPLET COALESCENCE DURING ATOMIZATION

FIELD

The present disclosure relates to ultrasonic atomizers for applying coatings to a substrate.

BACKGROUND

The statements in this section merely provide background information related to the present disclosure and may not constitute prior art.

Painting automotive vehicle components in a high volume production environment involves substantial capital expense. The current state-of-the-art applicators for high volume production are rotary bell applicators. With rotary bell applicators, the paint is atomized by rotating bells, which are essentially a rotating disk or bowl (also referred to as the bell) that spins at about 20,000-80,000 rpms. The paint is typically ejected from an annular slot on an interior face of the rotating bowl and is transported to the edges of the bell via centrifugal force. The paint then forms ligaments, which then separate into droplets at the edge of the bell. Although this equipment works for its intended purpose, various issues arise as a result of its design.

First, the momentum of the paint is mostly lateral, meaning it is moving off of the edge of the bell rather than towards the vehicle component. To compensate for this movement, a large amount of compressed gas called "shaping gas" or "shaping air" is applied that redirects the paint droplets towards the vehicle component. In addition, a voltage potential typically in the range of 40,000-80,000 volts is applied between the bell and the vehicle component in order to redirect and attract the droplets to the vehicle component. However, the droplets formed by rotary bell applicators have a fairly wide size distribution, which can cause appearance issues. Additionally, the voltage potential that redirects and attracts the droplets to the vehicle component requires large amounts of electricity and it can be difficult to control the voltage or ground connections on the vehicle component itself in a manner that evenly attracts the droplets across the vehicle component.

Ultrasonic atomization is one way of producing narrow particle size droplets of liquids that is different than rotary bell applicators. Ultrasonic atomizers include an actuator that vibrates a liquid behind a nozzle plate. The vibration causes ejection of fine droplets from small apertures in the nozzle plate such that the droplet momentum exiting the nozzle plate is perpendicular to the nozzle plate. However, despite the initial droplet sizes being smaller and within a narrower range than rotary bell applicators, the droplets typically do not have uniform spacing or uniform initial velocities due to a variety of factors including flow stability, non-Newtonian rheology, or turbulence effects. These irregularities can lead to droplet to coalescence before reaching the vehicle component. The coalescence can then lead to a wider size distribution further downstream still before reaching the vehicle component. Such wider size distribution can lead to inconsistency in coating appearance.

These issues of overspray, energy efficiency, transfer efficiency, and paint uniformity, among other issues related to the painting of automotive vehicle component or other objects in a high volume production environment, are addressed by the present disclosure.

SUMMARY

This section provides a general summary of the disclosure and is not a comprehensive disclosure of its full scope or all of its features.

In one form, the present disclosure provides an atomizer for applying a coating to a substrate includes a nozzle and at least one electrode. The nozzle defines a plurality of first apertures and at least one second aperture. The at least one second aperture is configured to direct a flow of gas to exit the nozzle. The nozzle includes a nozzle plate, a nozzle body, and an actuator. The nozzle plate defines the first apertures. The nozzle body and an inner side of the nozzle plate define a reservoir in fluid communication with the first apertures. The actuator is configured to vibrate the nozzle plate to eject droplets of a liquid from the reservoir through the first apertures. The at least one electrode is configured to electrostatically charge the flow of gas. The at least one second aperture is configured to direct the flow of gas toward the droplets as the droplets are ejected from the first apertures to electrostatically charge the ejected droplets.

In some configurations, the atomizer can optionally include one or more of the following: the nozzle plate defines the at least one second aperture; the at least one electrode is coupled to the nozzle plate and configured to electrostatically charge a portion of the nozzle plate that defines the at least one second aperture; the at least one electrode is configured to electrostatically charge a portion of the nozzle plate that defines the first apertures to directly charge the droplets ejected from the first apertures; the at least one second aperture includes a plurality of second apertures; the plurality of second apertures are configured to shape a spray pattern of the droplets as the droplets are ejected from the first apertures; the nozzle plate is disposed about an axis and the plurality of second apertures are disposed radially about the first apertures relative to the axis; the at least one electrode is positioned upstream of the at least one second aperture such that the at least one electrode charges the flow of gas before the flow of gas exits the nozzle; the at least one electrode is positioned to charge the flow of gas as the flow exits the nozzle through the at least one second aperture or immediately after the flow exits the nozzle through the at least one second aperture; the nozzle body defines at least one conduit in fluid communication with the at least one second aperture and configured to provide the flow of compressed gas to the at least one second aperture; the at least one electrode is configured to electrostatically charge the droplets to have a voltage potential less than or equal to 10 kV.

In another form, the present disclosure provides an atomizer for applying a coating to a substrate including a nozzle and at least one electrode. The nozzle includes a nozzle plate, a nozzle body, and an actuator. The nozzle plate defines a plurality of first apertures. The nozzle body and an inner side of the nozzle plate define a reservoir in fluid communication with the first apertures and configured to hold a liquid. The actuator is configured to vibrate the nozzle plate to eject droplets of the liquid from the reservoir through the first apertures. The at least one electrode is coupled to at least one of the nozzle plate and the nozzle body such that the at least one electrode is configured to electrostatically charge the at least one of the nozzle plate and the nozzle body to electrostatically charge the droplets ejected from the first apertures.

In some configurations, the atomizer can optionally include one or more of the following: the at least one electrode is configured to electrostatically charge the liquid in the reservoir; the nozzle defines at least one second aperture configured to direct a flow of gas toward the droplets as the droplets are ejected from the first apertures; the at least one electrode is configured to charge the gas as it exits the at least one second aperture such that the charged gas charges the droplets; the nozzle plate defines the at least one second aperture; the at least one electrode is coupled to the nozzle plate to charge the nozzle plate such that the nozzle plate is configured to directly charge the droplets as the droplets are ejected from the first apertures; the at least one electrode is configured to electrostatically charge the droplets to have a voltage potential less than or equal to 10 kV.

In yet another form, the present disclosure provides an atomizer for atomizer for applying a coating to a substrate including a nozzle and at least one electrode. The nozzle defines a plurality of first apertures and at least one second aperture. The at least one second aperture is configured to direct a flow of gas to exit the nozzle. The nozzle includes a nozzle plate, a nozzle body, and an actuator. The nozzle plate defines the first apertures. The nozzle body and an inner side of the nozzle plate define a reservoir in fluid communication with the first apertures. The actuator is configured to vibrate the nozzle plate to eject droplets of a liquid from the reservoir through the first apertures. The at least one electrode is configured to electrostatically charge the flow of gas before the gas exits the nozzle. The at least one second aperture is configured to direct the flow of gas toward the droplets as the droplets are ejected from the first apertures to electrostatically charge the ejected droplets.

In some configurations, the atomizer can optionally include the at least one electrode being configured to electrostatically charge the droplets to have a voltage potential less than or equal to 10 kV.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
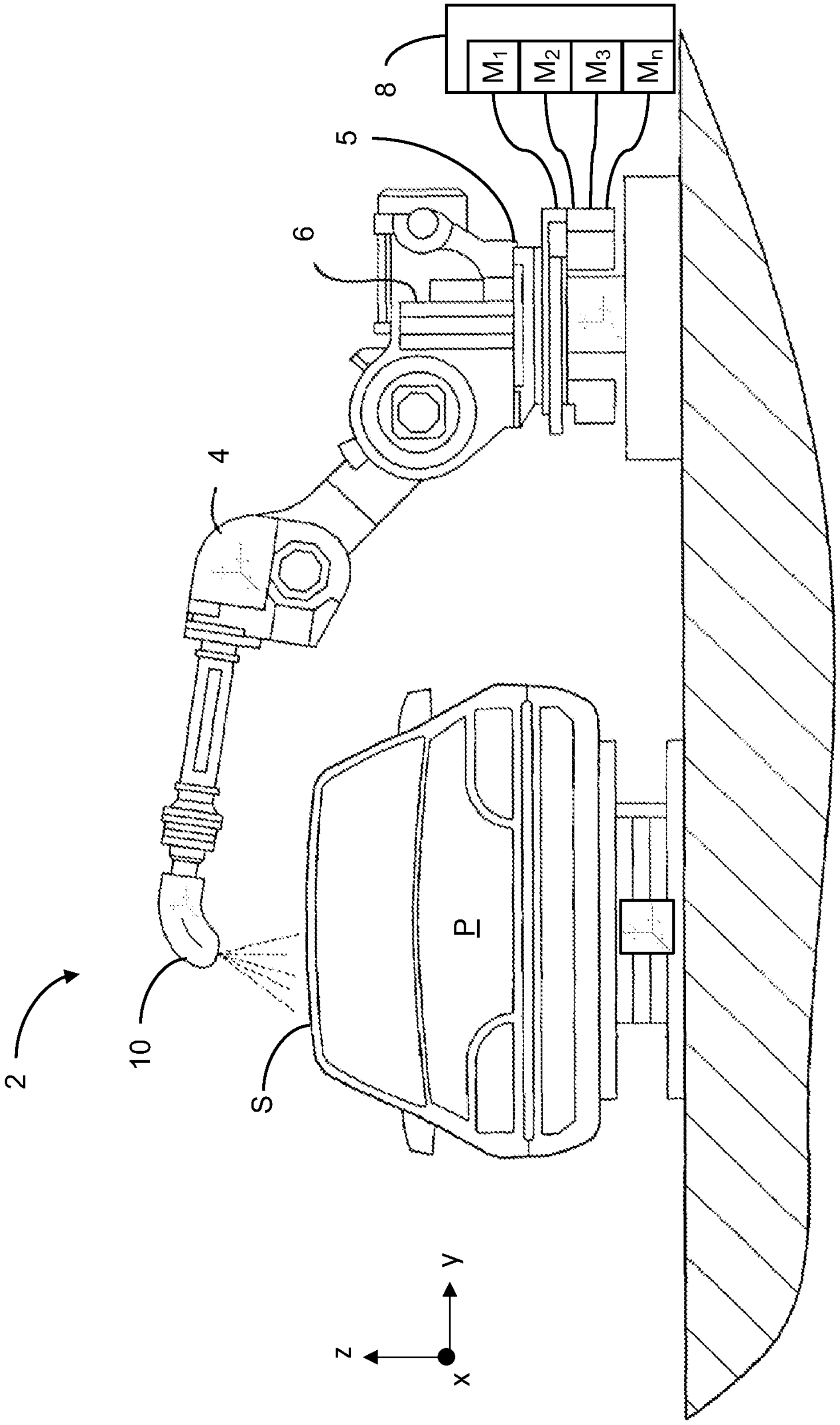
FIG. 1 is a side view of a paint spray system according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides a variety of devices, methods, and systems for controlling the application of paint to automotive vehicles in a high production environment. It should be understood that the reference to automotive vehicles is merely exemplary and that other objects that are painted, such as industrial equipment and appliances, among others, may also be painted in accordance with the teachings of the present disclosure. Further, the use of "paint" or "painting" should not be construed as limiting the present disclosure, and thus other materials such as coatings, primers, sealants, cleaning solvents, among others, are to be understood as falling within the scope of the present disclosure.

Generally, the teachings of the present disclosure are based on a droplet spray generation device in which a perforate membrane is driven by a piezoelectric transducer. This device and variations thereof are described in U.S. Pat. Nos. 6,394,363, 7,550,897, 7,977,849, 8,317,299, 8,191,982, 9,156,049, 7,976,135, 9,452,442, and U.S. Published Application Nos. 2014/0110500, 2016/0228902, and 2016/0158789, which are incorporated herein by reference in their entirety.

Referring now to FIG. 1, a paint spray system 2 for painting a workpiece or part P (also referred to herein as a substrate) using a robotic arm 4 is schematically depicted. The robotic arm 4 is coupled to at least one material applicator 10 and a rack 5. A material source 8 (e.g., a paint source) is included and includes at least one material M (materials $M_1$, $M_2$, $M_3$, . . . $M_n$ shown in FIG. 1; referred to herein simply as "material M" and "material(s)"). In some aspects of the present disclosure the material M includes paint materials, priming materials, corrosion resistance materials, adhesive materials, sealant materials, and the like. The arm 4 moves according to xyz coordinates with respect to the rack 5 such that the material applicator 10 moves across a surface S of the part P. Also, a power source 6 is configured to supply power to the arm 4 and the rack 5. The arm 4, rack 5, and the power source 6 are configured to supply material M from the material source 8 to the material applicator 10 such that a coating is produced on the surface S of the part P. While FIG. 1 schematically depicts a paint system 2 with one robotic arm 4, it should be understood that the paint spray system 2 can include more than one robotic arm 4 while being included in the teachings of the present disclosure. It should also be understood that the robotic arm 4 and the rack 5 are optional such that the material applicator 10 may be mounted to another device such as a movable gantry for example while remaining within the teachings of the present disclosure. It should also be understood that the material applicator 10 may alternatively be mounted to a stationary support structure and the part P can be moved relative to the material applicator 10, such as by a conveyor or robotic arm for example, while remaining within the teachings of the present disclosure.

Figure 2:
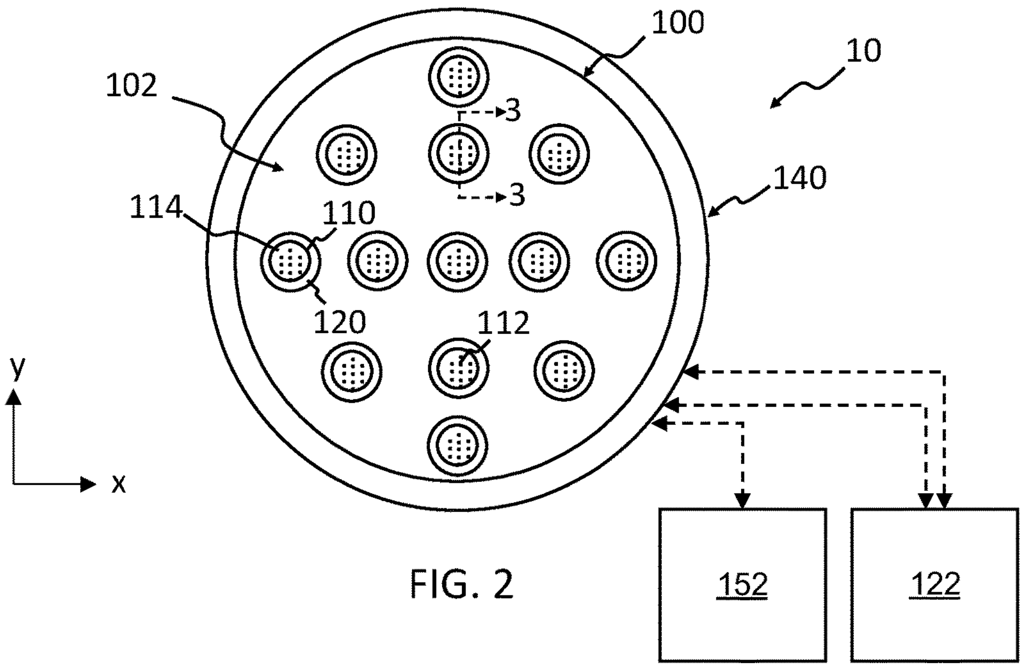
FIG. 2 is a front view of an array of micro-applicators of the paint spray system of FIG. 1.
Figure 3:
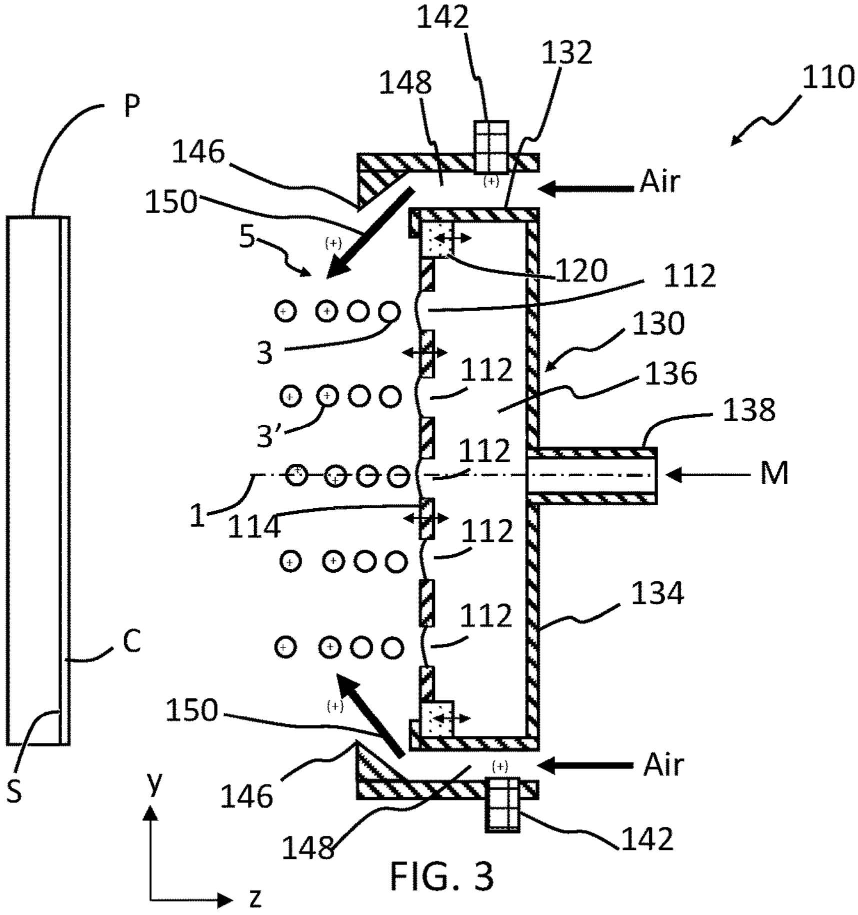
FIG. 3 is a cross-sectional view of one of the micro-applicators of FIG. 2, taken along line 3-3 shown in FIG. 2.

Referring now to FIGS. 2 and 3, the material applicator 10 according to the teachings of the present disclosure is schematically shown. In one form of the present disclosure, the material applicator 10 includes an array plate 100 with an applicator array 102 including a plurality of micro-applicators 110. In some aspects of the present disclosure, the array plate 100 with the applicator array 102 is positioned within a housing 140. In other forms of the present disclosure, not specifically shown, the material applicator 10 can include only one micro-applicator 110.

Each of the micro-applicators 110 includes a micro-applicator plate 114 (also referred to herein as the nozzle plate 114) that defines a plurality of apertures 112 extending through the nozzle plate 114, through which the material M is ejected such that atomized droplets 3 are formed and propagate generally normal to the nozzle plate 114 as schematically depicted in FIG. 3. In the example provided, the nozzle plate 114 is a generally circular shaped disc disposed concentrically about the axis 1, though other shapes can be used. Also, each of the micro-applicators 110 includes a transducer 120, a frame or nozzle body 130, a material inlet 138, and an electrode 142. Each of the micro-applicators 110 may also include one or more gas apertures 146 coupled to one or more gas conduits 148.

In the example provided, the gas apertures 146 and gas conduits 148 are defined by the nozzle body 130, though other configurations can be used, such as being separate from the nozzle body for example. While only two gas apertures 146 are illustrated in diametrically opposed positions that are radially outward of the nozzle plate 114, it should be understood that other configurations can be used. For example, a plurality of gas apertures 146 can be disposed in any suitable configuration. One such configuration may be an array circumferentially disposed about the nozzle plate 114. In an alternative configuration, a single gas aperture may be used while remaining within the scope of the present disclosure. In one example, a single, annular gas aperture may be disposed concentrically about the nozzle plate 114.

The gas apertures 146 are configured to direct gas (represented by arrows 150) exiting therefrom toward the droplets 3. As used herein, the term "gas" includes any suitable gas such as air, nitrogen, or other suitable gases. In the example provided, each gas aperture 146 is angled radially inward toward the exiting droplets 3. Each gas aperture 146 includes a corresponding electrode 142 configured to electrostatically charge the gas 150 provided by the gas aperture 146. In one form, each electrode is configured to charge the gas 150 with a charge of less than 10,000 volts. In another form, the electrode can be configured to charge the gas 150 with a charge of more than 10,000 volts.

In the example shown, the electrode 142 charges the gas 150 so that the gas 150 has a positive charge, though a negative charge may be used instead of a positive charge as long as all of the gas 150 exiting the gas apertures 146 are charged with the same sign (i.e., positive or negative) of charge. In the example provided, the electrode 142 is positioned in the gas conduit 148 upstream of the gas aperture 146.

In an alternative configuration, not specifically shown, the electrode 142 can be located at (i.e., in or immediately outside of) the gas aperture 146 such that the electrode charges the gas 150 as it exits the gas aperture 146.

The electrode 142 can be in direct contact with the gas to directly charge the gas or can charge the component (e.g., the nozzle body 130) defining the gas aperture 146 or gas conduit 148 such that the electrode 142 indirectly charges the gas 150 via the component. The charged gas 150 then impacts or otherwise comes close enough to the droplets 3 to charge the droplets 3 (charged droplets are indicated in the drawings by reference number 3').

In one form, the gas pressure and gas apertures 146 are configured such that the gas 150 is also shaping gas that can direct or shape the pattern of droplets. In another form, the gas pressure and gas apertures 146 can be configured such that the gas 150 charges the droplets 3 but does not directly shape their pattern in any meaningful way. In another form, not specifically shown, separate shaping gas conduits can provide non-charged gas at positions and pressures configured to shape the pattern of the charged droplets 3' separately from the gas conduits 148 that charge the droplets 3. In configurations where the charged gas does not also act as shaping gas, the pressure of the charged gas can be less than the pressure of typical shaping gas.

The transducer 120 is in mechanical communication with the nozzle plate 114 such that activation of the transducer 120 ultrasonically vibrates the nozzle plate 114 as schematically depicted by the horizontal (z-direction) double-headed arrows in FIG. 3. The nozzle body 130 includes a back wall 134 and at least one sidewall 132 that cooperate with the nozzle plate 114 to define a reservoir 136 for containing the material M. The apertures 112 are sized such that surface tension of the material M prevents the material from exiting the apertures 112 absent actuation by the transducer 120. The inlet 138 is in fluid communication with the reservoir 136 and the material source 8 (FIG. 1) such that the material M flows from the material source 8, through inlet 138 and into reservoir 136.

The transducer 120 is a piezoelectric transducer such that electrical power actuates the transducer 120 to vibrate. The transducer 120 is connected to a controller 122 (FIG. 2) for electrical communication therewith. The controller 122 is configured to control actuation of the transducer 120 by controlling electrical power thereto. In the example shown in FIG. 3, the transducer 120 is an annular shape and disposed between the nozzle plate 114 and the nozzle body 130, though other configurations can be used. In one alternative configuration, not specifically shown, the nozzle plate 114 is connected to the nozzle body 130 and the transducer 120 is affixed to the nozzle plate 114. In such a configuration, the transducer 120 may or may not be annular in shape. In another alternative configuration, not specifically shown, the transducer 120 is mounted to the nozzle body 130 separate from the nozzle plate 114 such that the transducer 120 indirectly vibrates the nozzle plate 114 by producing vibrations in either the nozzle body 130 or by producing vibration waves in the material M that is within the reservoir 136. In such a configuration, the transducer 120 may or may not be annular in shape.

The controller 122 is also connected to the electrode 142 for electrical communication therewith and configured to control operation of the electrode 142.

In operation, the controller 122 actuates the transducer 120 to cause the material M to exit the apertures 112 as droplets 3. The droplets 3 exit the apertures 112 generally perpendicular to the nozzle plate 114.

The controller 122 also activates a source of pressurized gas 152 (FIG. 2) to provide gas 150 to the gas conduits 148 such that the gas 150 exits the gas apertures 146.

The controller 122 also activates the electrodes 142 to electrostatically charge the gas 150. The electrostatically charged gas 150 exits the gas apertures 146 and electrostatically charges the droplets 3 (indicated by 3' after being charged). The charge of the droplets 3' is sufficient to repel individual droplets 3' from other individual droplets 3'.

The gas apertures 146 may be angled to direct the charged gas 150 in a direction that has a radially inward component (i.e., toward the droplets 3) and an axial component (i.e., toward the surface S). The gas apertures 146 are constructed such that the charged gas 150 charges the droplets 3 before the droplets 3' can coalesce. In one non-limiting configuration, the gas apertures 146 are angled to engage the droplets 3 within 20 millimeters of the nozzle plate 114.

In one form, the charge of the droplets 3' is sufficient to repel the individual droplets 3' from each other but insufficient to meaningfully attract the droplets 3' to the surface S. In an alternative configuration, the charge is sufficient to repel the individual droplets 3' from each other and may also be sufficient to attract the droplets 3' to the surface S.

Figure 4:
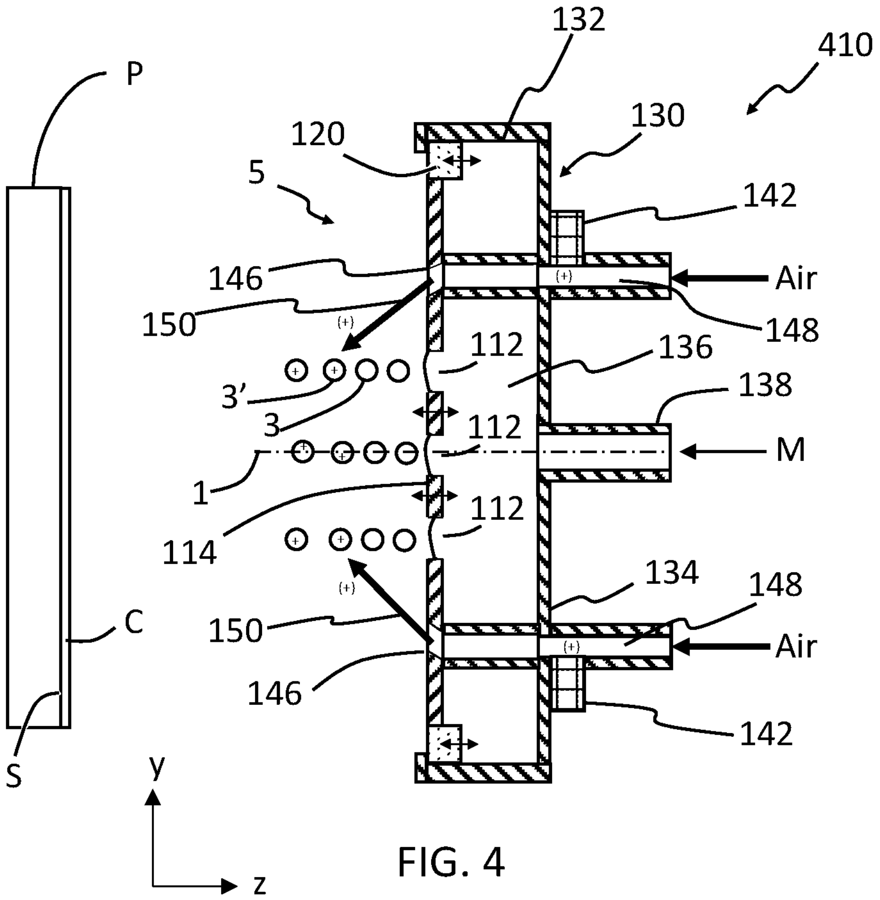
FIG. 4 is a cross-sectional view similar to FIG. 3, illustrating a micro-applicator of a second construction according to the teachings of the present disclosure.

Referring to FIG. 4, a micro-applicator 410 of a second construction is illustrated. The micro-applicator 410 is similar to the micro-applicator 110 described above except as otherwise shown and described herein. Accordingly, similar reference numbers refer to similar features and only differences are described in detail herein.

In the micro-applicator 410, the nozzle plate 114 defines the gas apertures 146 and the gas conduits 148 extend through the nozzle body 130. In one form, the electrodes 142 are disposed within the gas conduits 148 to directly charge the gas 150. In an alternative form, the electrodes 142 can charge the walls of the gas conduits 148 so that the gas conduits 148 charge the gas. In yet another form, not specifically shown, the electrodes 142 can be disposed downstream of the gas apertures 146 such that the electrodes 142 charge the gas 150 immediately after the gas 150 exits the gas apertures 146. In still another form, not specifically shown, the electrodes 142 can be disposed on the nozzle plate 114 near the gas apertures 146 such that the electrodes 142 charge the gas 150 as it exits the gas apertures 146.

In the example provided, the gas apertures 146 are radially outward of the apertures 112, though other configurations can be used. In one alternative example, not specifically shown, the gas apertures can be disposed between the apertures 112. In the example shown, the micro-applicator 410 does not include gas apertures radially outward of the nozzle plate 114, though other configurations can be used. In one alternative construction, not specifically shown, additional gas conduits and gas apertures can be disposed radially outward of the nozzle plate 114, similar to those shown in FIG. 3 and described above, in addition to the gas apertures 146 defined by the nozzle plate 114. In one such example, the gas 150 from the gas apertures 146 defined by the nozzle plate 114 can charge the droplets 3 and the gas from the gas apertures that are disposed radially outward of the nozzle plate 114 can be shaping gas that can be either charged or not charged.

Figure 5:
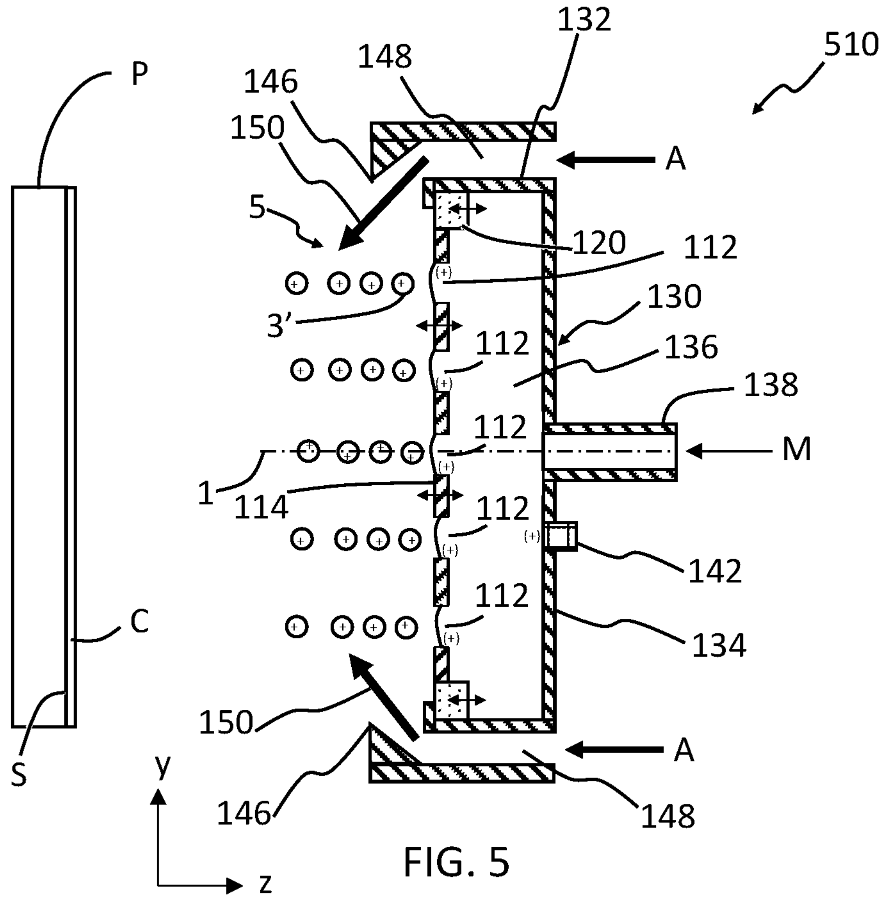
FIG. 5 is a cross-sectional view similar to FIG. 3, illustrating a micro-applicator of a third construction according to the teachings of the present disclosure.

Referring to FIG. 5, a micro-applicator 510 of a third construction is illustrated. The micro-applicator 510 is similar to the micro-applicator 110 described above except as otherwise shown and described herein. Accordingly, similar reference numbers refer to similar features and only differences are described in detail herein.

In the micro-applicator 510, the electrode 142 does not charge the gas 150 that exits from the gas apertures 146. In the example shown, the electrode 142 is coupled to the nozzle body 130 and extends into the reservoir 136 to electrostatically charge the material M in the reservoir 136. In alternative configuration, not specifically shown, the electrode 142 can be configured to charge the nozzle body 130 and the nozzle body is an electrically conductive material such that the charged nozzle body 130 charges the material M in the reservoir 136. In yet another alternative configuration, not specifically shown, the electrode 142 is mounted to the nozzle body 130 or another component of the micro-applicator 510 that is in electrical communication with the nozzle plate 114 such that the nozzle plate 114 is charged indirectly by the electrode 142 and the material M becomes charged by the nozzle plate 114. In such a configuration, the material M in the reservoir 136 can be charged by the nozzle plate 114 or the material M can be charged by the nozzle plate 114 as it is ejected from the apertures 112 in the form of droplets 3'.

In the example shown, the gas apertures 146 provide uncharged shaping gas. In an alternative construction, not specifically shown, the gas exiting the gas apertures 146 can also be charged by an additional electrode. In yet another alternative configuration, not specifically shown, the micro-applicator 510 can be without the gas apertures 146, such as without shaping gas, for example.

Figure 6:
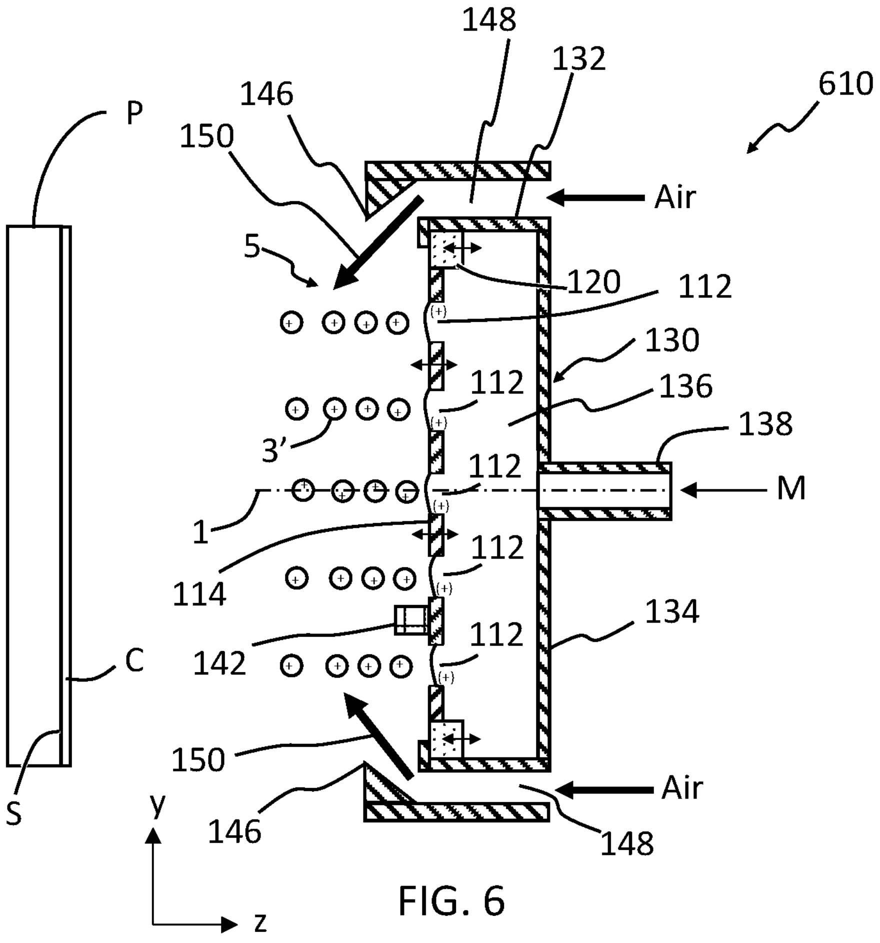
FIG. 6 is a cross-sectional view similar to FIG. 3, illustrating a micro-applicator of a fourth construction according to the teachings of the present disclosure.

Referring to FIG. 6, a micro-applicator 610 of a fourth construction is illustrated. The micro-applicator 610 is similar to the micro-applicator 110 described above except as otherwise shown and described herein. Accordingly, similar reference numbers refer to similar features and only differences are described in detail herein.

In the micro-applicator 610, the electrode 142 does not charge the gas 150 that exits from the gas apertures 146. In the example shown, the electrode 142 is coupled to the nozzle plate 114 to charge a portion of the nozzle plate 114. The portion of the nozzle plate 114 may include the entire nozzle plate 114 or may be less than the entire nozzle plate 114 such as just a portion proximate to the apertures 112. The material M in the reservoir 136 can become charged or the material M can become charged as it is ejected from the apertures 112 as droplets 3'.

In the example shown, the gas apertures 146 provide uncharged shaping gas. In an alternative construction, not specifically shown the gas exiting the gas apertures 146 can also be charged. In yet another alternative configuration, not specifically shown, the micro-applicator 610 can be without the gas apertures 146, such as without shaping gas, for example.

Figure 7:
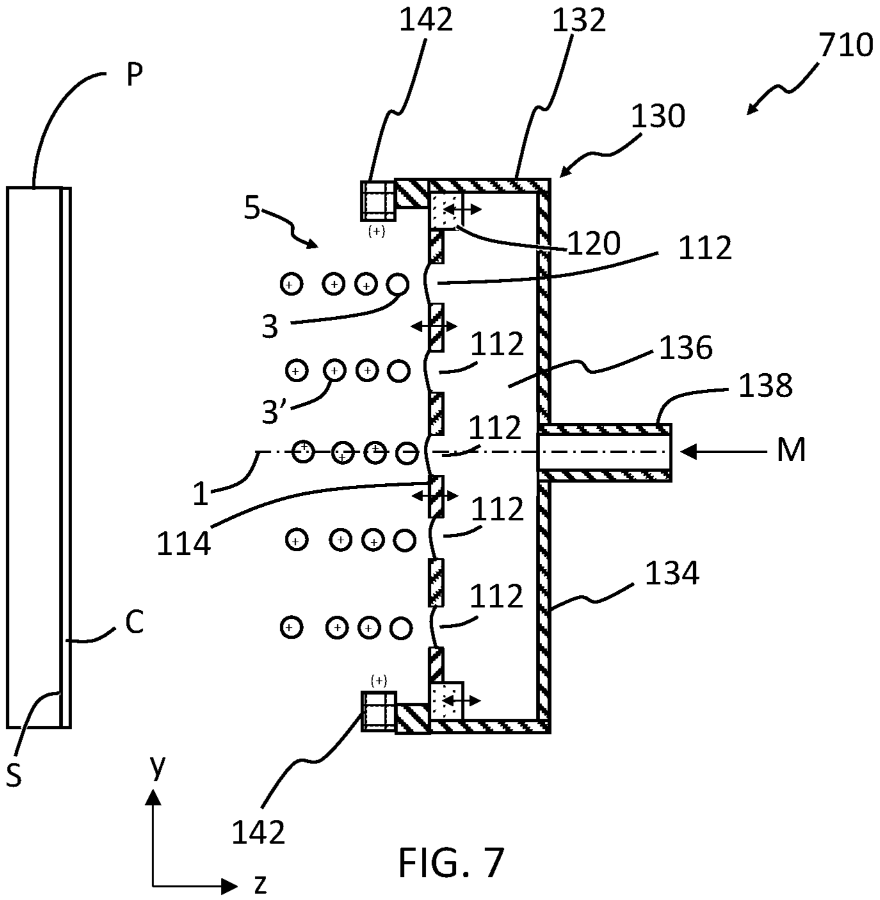
FIG. 7 is a cross-sectional view similar to FIG. 3, illustrating a micro-applicator of a fifth construction according to the teachings of the present disclosure.

Referring to FIG. 7, a micro-applicator 710 of a fourth construction is illustrated. The micro-applicator 710 is similar to the micro-applicator 110 described above except as otherwise shown and described herein. Accordingly, similar reference numbers refer to similar features and only differences are described in detail herein.

In the micro-applicator 710, the electrodes 142 do not charge gas that exits from the gas apertures. Instead, the electrodes 142 is configured to charge ambient gas proximate to the nozzle plate 114 such that the charged ambient gas charges the droplets 3 after they exit the apertures 112. In the example provided, the electrodes 142 are mounted to the nozzle body 130 though other configurations can be used.

The micro-applicators of the present disclosure electrostatically charge the fine droplets created by an ultrasonic atomizer with sufficient charge such that the droplets repel each other to inhibit coalescence of the droplets before the droplets reach the surface S of the workpiece P. In some forms, the charge is small enough (e.g., less than 10,000 volts) such that the attraction of the charged droplets to the surface S of the workpiece P is negligible. Accordingly, the present disclosure provides for a paint applicator that can provide an improved surface finish.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An atomizer for applying a coating to a substrate, the atomizer comprising:
- at least one nozzle, each nozzle including:
  - a nozzle plate defining a plurality of first apertures;
  - a nozzle body, the nozzle body and an inner side of the nozzle plate defining a reservoir in fluid communication with the plurality of first apertures and configured to hold a liquid; and
  - an actuator configured to vibrate the nozzle plate to eject droplets of the liquid from the reservoir through the plurality of first apertures; and
- at least one electrode coupled to at least one of the nozzle plate and the nozzle body such that the at least one electrode is configured to electrostatically charge the at least one of the nozzle plate and the nozzle body to electrostatically charge the droplets ejected from the plurality of first apertures,
- wherein each nozzle defines at least one second aperture configured to direct a flow of gas toward the droplets as the droplets are ejected from the plurality of first apertures and configured to shape a spray pattern of the droplets ejected from the plurality of first apertures, and
- wherein each first aperture directs a droplet in a first direction and each second aperture directs the flow of gas in a second direction that is different from the first direction, and
- wherein the at least one second aperture is located further forward in an axial direction than the first apertures.

2. The atomizer according to claim 1, wherein the at least one electrode is configured to electrostatically charge the liquid in the reservoir.

3. The atomizer according to claim 1, wherein the at least one electrode is coupled to the nozzle plate to charge the nozzle plate such that the nozzle plate is configured to directly charge the droplets as the droplets are ejected from the plurality of first apertures.

4. The atomizer according to claim 1, wherein the at least one nozzle includes three or more of the nozzles coupled to a housing for common movement relative to the substrate.

5. The atomizer according to claim 4, wherein the at least one electrode includes a plurality of electrodes, each electrode being configured to electrostatically charge the at least one of the nozzle plate and the nozzle body of a corresponding one of the nozzles.

6. The atomizer according to claim 1, wherein the liquid is at least one of a paint, a primer, a sealant, a corrosion resistance material, an adhesive, and a cleaning solvent.

7. The atomizer according to claim 1, wherein the at least one electrode is configured to electrostatically charge the droplets to have a voltage potential greater than or equal to 1 kV and less than or equal to 10 kV.

8. An atomizer for applying a coating to a substrate, the atomizer comprising:
- at least three nozzles, each nozzle including:
  - a nozzle plate defining a plurality of first apertures;
  - a nozzle body, the nozzle body and an inner side of the nozzle plate defining a reservoir in fluid communication with the plurality of first apertures and configured to hold a liquid; and
  - an actuator configured to vibrate the nozzle plate to eject droplets of the liquid from the reservoir through the plurality of first apertures; and
- at least one electrode coupled to at least one of the nozzle plate and the nozzle body such that the at least one electrode is configured to electrostatically charge the at least one of the nozzle plate and the nozzle body to electrostatically charge the droplets ejected from the plurality of first apertures
- wherein each nozzle defines at least one second aperture configured to direct a flow of gas toward the droplets as the droplets are ejected from the plurality of first apertures and configured to shape a spray pattern of the droplets ejected from the plurality of first apertures and
- wherein each first aperture directs a droplet in a first direction and each second aperture directs the flow of gas in a second direction that is different from the first direction, and
- wherein the at least one second aperture is located further forward in an axial direction than the first apertures.

9. The atomizer according to claim 8, wherein the at least one electrode is configured to electrostatically charge the liquid in the reservoir.

10. The atomizer according to claim 8, wherein the at least one electrode is coupled to the nozzle plate of each nozzle to charge the nozzle plate such that the nozzle plate is configured to directly charge the droplets as the droplets are ejected from the plurality of first apertures.

11. The atomizer according to claim 8, wherein the at least three nozzles are coupled to a housing for common movement relative to the substrate.

12. The atomizer according to claim 11, wherein the at least one electrode includes a plurality of electrodes, each electrode being configured to electrostatically charge the at least one of the nozzle plate and the nozzle body of a corresponding one of the nozzles.

13. The atomizer according to claim 8, wherein the liquid is at least one of a paint, a primer, a sealant, a corrosion resistance material, an adhesive, and a cleaning solvent.

14. The atomizer according to claim 8, wherein the at least one electrode is configured to electrostatically charge the droplets to have a voltage potential greater than or equal to 1 kV and less than or equal to 10 kV.

15. An atomizer for applying a coating to a substrate, the atomizer comprising:

at least one nozzle, each nozzle including:

a nozzle plate defining a plurality of first apertures;

a nozzle body, the nozzle body and an inner side of the nozzle plate defining a reservoir in fluid communication with the plurality of first apertures and configured to hold a liquid comprising at least one of a paint, a primer, a sealant, a corrosion resistance material, an adhesive, and a cleaning solvent; and an actuator configured to vibrate the nozzle plate to eject droplets of the liquid from the reservoir through the plurality of first apertures; and at least one electrode coupled to at least one of the nozzle plate and the nozzle body such that the at least one electrode is configured to electrostatically charge the at least one of the nozzle plate and the nozzle body to electrostatically charge the droplets ejected from the plurality of first apertures, wherein each nozzle defines at least one second aperture configured to direct a portion of a flow of gas radially inward toward the droplets as the droplets are ejected from the plurality of first apertures and configured to shape a spray pattern of the droplets ejected from the plurality of first apertures, and wherein each second aperture is angled in a non-parallel direction toward an axis extending through a respective first aperture of the plurality of first apertures, and wherein the at least one second aperture is located further forward in an axial direction than the first apertures.

* * * * *